United States Patent
Hauer

(10) Patent No.: US 7,928,684 B2
(45) Date of Patent: Apr. 19, 2011

(54) DRIVE DEVICE FOR MOVABLE FURNITURE PARTS

(75) Inventor: Christian Hauer, Hörbranz (AT)

(73) Assignee: Julius Blum GmbH, Höchst (AT)

( * ) Notice: Subject to any disclaimer, the term of this patent is extended or adjusted under 35 U.S.C. 154(b) by 216 days.

(21) Appl. No.: 12/385,861

(22) Filed: Apr. 22, 2009

(65) Prior Publication Data

US 2009/0230795 A1  Sep. 17, 2009

Related U.S. Application Data

(63) Continuation of application No. PCT/AT2007/000471, filed on Oct. 4, 2007.

(30) Foreign Application Priority Data

Oct. 23, 2006  (AT) .................. A 1769/2006

(51) Int. Cl.
*G05D 15/00* (2006.01)
(52) U.S. Cl. ..... 318/646; 318/532; 318/640; 312/319.6; 312/319.5
(58) Field of Classification Search .................. 318/646, 318/532, 640; 312/319.5, 319.6
See application file for complete search history.

(56) References Cited

U.S. PATENT DOCUMENTS

| | | |
|---|---|---|
| 3,005,672 A | 10/1961 | Becker |
| 5,915,514 A | 6/1999 | Nojiri et al. |
| 7,282,884 B2 * | 10/2007 | Huber et al. .................. 318/646 |
| 7,602,135 B2 * | 10/2009 | Huber et al. .................. 318/651 |
| 2004/0100169 A1 * | 5/2004 | Huber et al. ............... 312/319.5 |
| 2006/0261775 A1 | 11/2006 | Huber et al. |
| 2007/0170828 A1 | 7/2007 | Hoshide et al. |

FOREIGN PATENT DOCUMENTS

| | | |
|---|---|---|
| DE | 1 196 462 | 7/1965 |
| DE | 195 81 600 | 3/1997 |
| DE | 102 00 168 | 7/2003 |
| DE | 102 28 891 | 1/2004 |
| DE | 103 05 291 | 8/2004 |
| EP | 1 710 380 | 10/2006 |
| FR | 2 476 193 | 8/1981 |
| WO | 2004/100717 | 11/2004 |

OTHER PUBLICATIONS

International Search Report issued Dec. 11, 2007 in the International (PCT) Application of which the present application is the U.S. National Stage.
Austrian Search Report issued Jun. 27, 2007 in the International (PCT) Application of which the present application is the U.S. National Stage.

* cited by examiner

*Primary Examiner* — Paul Ip
(74) *Attorney, Agent, or Firm* — Wenderoth, Lind & Ponack, L.L.P.

(57) ABSTRACT

An article of furniture includes a drive device for moving a movable furniture part. The drive device includes an electric drive unit and a coupling device for at least temporarily transmitting a force of the electric drive unit to the movable furniture part, and the coupling device has a drive and a drive output. Operating between the drive and the drive output are coupling elements by which, in a first operating position, a clamping connection between the drive and the drive output and thus coupling between the drive and the drive output can be produced, and, in a second operating position, the coupling elements are movable into a position in which the drive and the drive output are not coupled.

23 Claims, 7 Drawing Sheets

DRIVE DEVICE FOR MOVABLE FURNITURE PARTS

Figure 1:
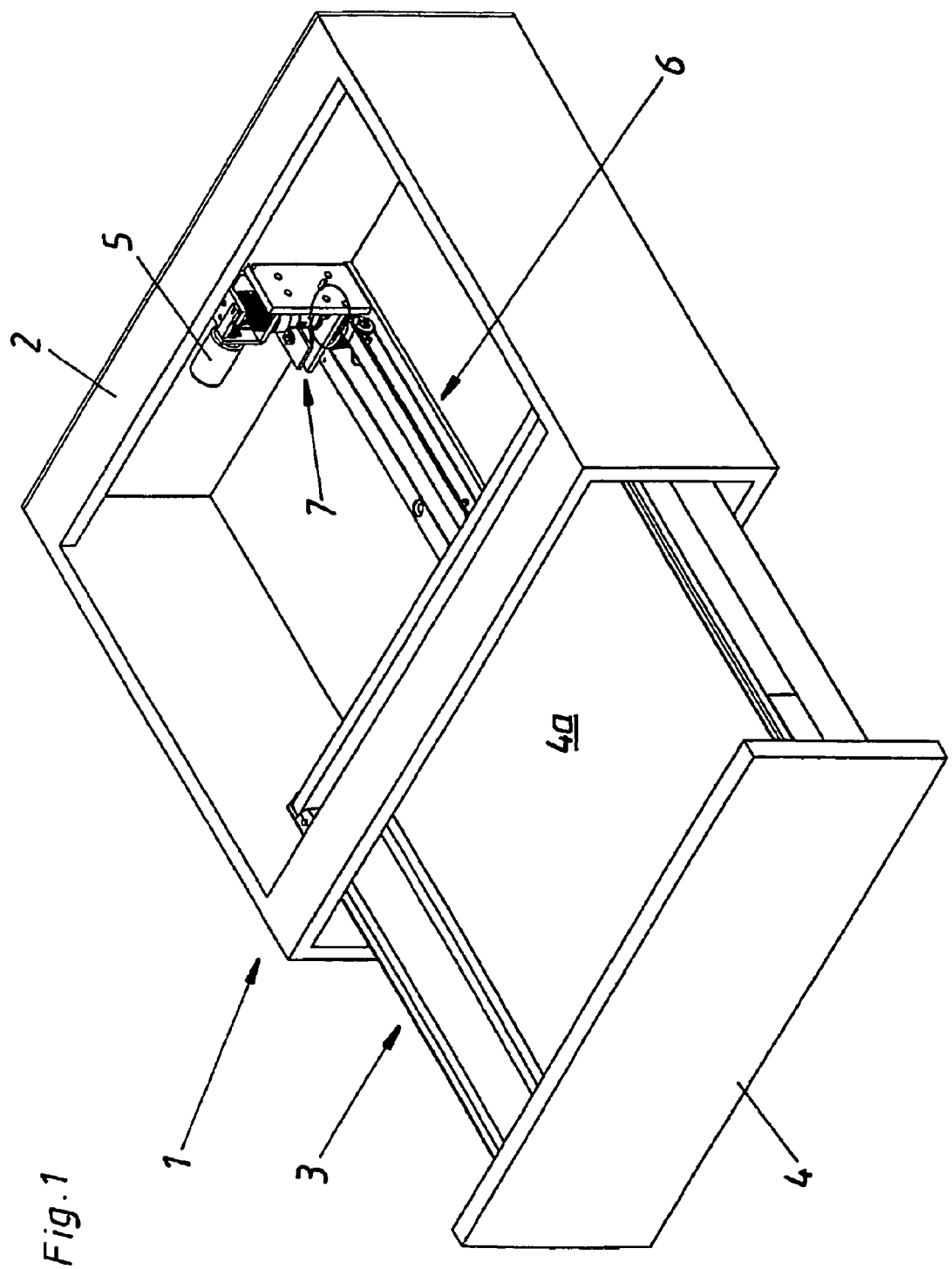

This application is a continuation application of International application PCT/AT2007/000471, filed Oct. 4, 2007, the entire disclosure of which is incorporated herein by reference.

The present invention relates to an article of furniture having a drive device for movable furniture parts, with a preferably electric drive unit and a coupling device for at least temporarily transmitting the force of the electric drive unit to the movable furniture part, wherein the coupling apparatus has a drive and a drive output.

The use of such drive devices comprising an electric motor and a coupling assembly has long been known in the state of the art. Those coupling devices are frequently in the form of overload safety devices which are uncoupled from the electric drive when a predetermined maximum torque is reached or exceeded. In the event of a defect, motors, due to the braking action inherent therein, represent an obstacle to manual operation so that the movable furniture part cannot be used until repair has been effected. In addition the speed of the driven furniture part is predetermined by the speed of the electric drive, which is often found to be a disadvantage as handling of the movable furniture part is rather desired in accordance with the working tempo of the respective user.

It is therefore an object of the present invention to provide an article of furniture having a drive device of the general kind set forth in the opening part of this specification, which advantageously links the advantages of an electric drive with the advantages of manual operability.

In accordance with the invention this is achieved in that operative between the drive and the drive output are coupling elements by which in a first operating position a clamping connection can be produced between the drive and the drive output and thus coupling thereof can be attained, and which in a second operating position the coupling elements are movable—preferably by spring means—into a position in which the drive and the drive output are not coupled.

The proposed—preferably only mechanically functioning—coupling makes it possible in the first operating position to transmit the forces from the electric drive unit to the drive output shaft and thus to the movable furniture part, wherein the movable furniture part is movable by way of the electric drive unit. In the second operating position of the coupling apparatus it is possible for the drive output and therewith the movable furniture part to be separated from the electric drive unit, in which case in addition undisturbed manual operation of the movable furniture part is made possible. It can be provided that the second operating position can also be activated during the first operating position of the coupling device, that is to say that the movable furniture part can also manually be moved during the driven movement in a direction of movement predetermined by the drive apparatus. In that way the driven movable furniture part can be moved at a higher speed than at the speed predetermined by the electric drive unit.

According to a embodiment it can be provided that the drive and the drive output are rotatable relative to each other and are preferably arranged coaxially relative to each other.

An advantageous configuration of the invention is afforded if a mechanical coupling between drive and drive output can be automatically produced by the coupling device in the two directions of rotation of the electric drive device.

A further embodiment provides that the drive output is freely movable in both directions of rotation starting from an uncoupled condition between the drive and the drive output.

In the stopped condition of the electric drive unit the coupling is preferably 'disconnected', that is to say no forces are transmitted between the motor and the drive output so that the power train between the motor and the drive output is interrupted. That permits undisturbed manual operation of the movable furniture part between the end positions thereof.

A further embodiment provides that the drive output is movable—for example manually—in a direction of rotation exerted in the direction of the drive unit—starting from a coupled condition between the drive and the drive output—if the drive output is moved faster than the drive. In that way the user can move the movable furniture part—for example by an assisting manual movement—at a higher speed than the speed predetermined by the drive device.

Desirably the electric drive unit has at least one electric motor which is preferably switchable in two directions of rotation.

In accordance with a preferred embodiment of the invention it can be provided that the clamping connection produced can be released by the electric drive being moved after a stop in a direction of rotation within a predetermined angular range (preferably slight, between about 2° and 6°) in the opposite direction of rotation.

In a preferred embodiment the movable furniture part is in the form of a drawer displaceable relative to a body or carcass of an article of furniture. Alternatively however it can also be provided that the movable furniture part is a flap or door of an article of furniture, which is pivotable about an axis.

Figure 2:
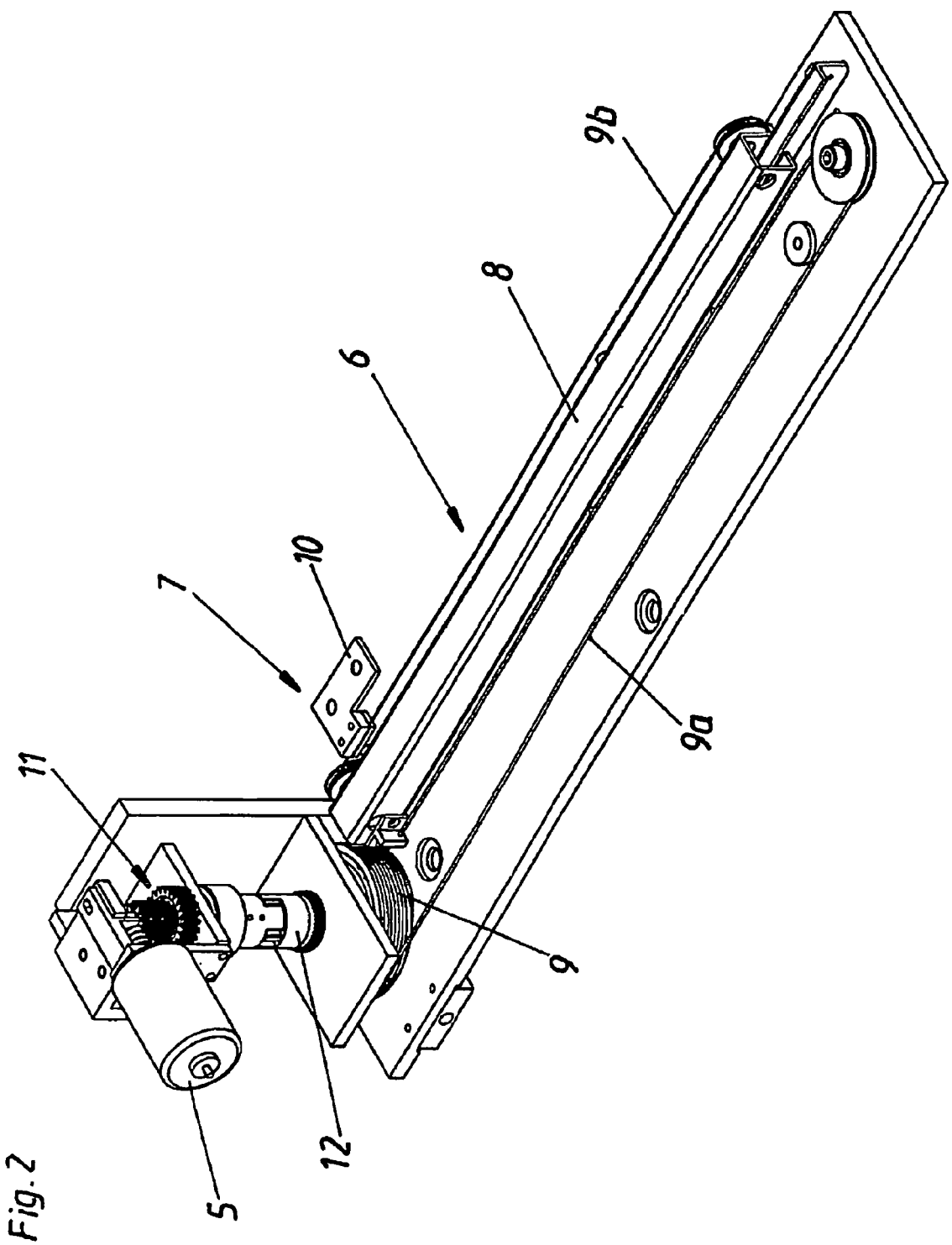
Figure 3A:
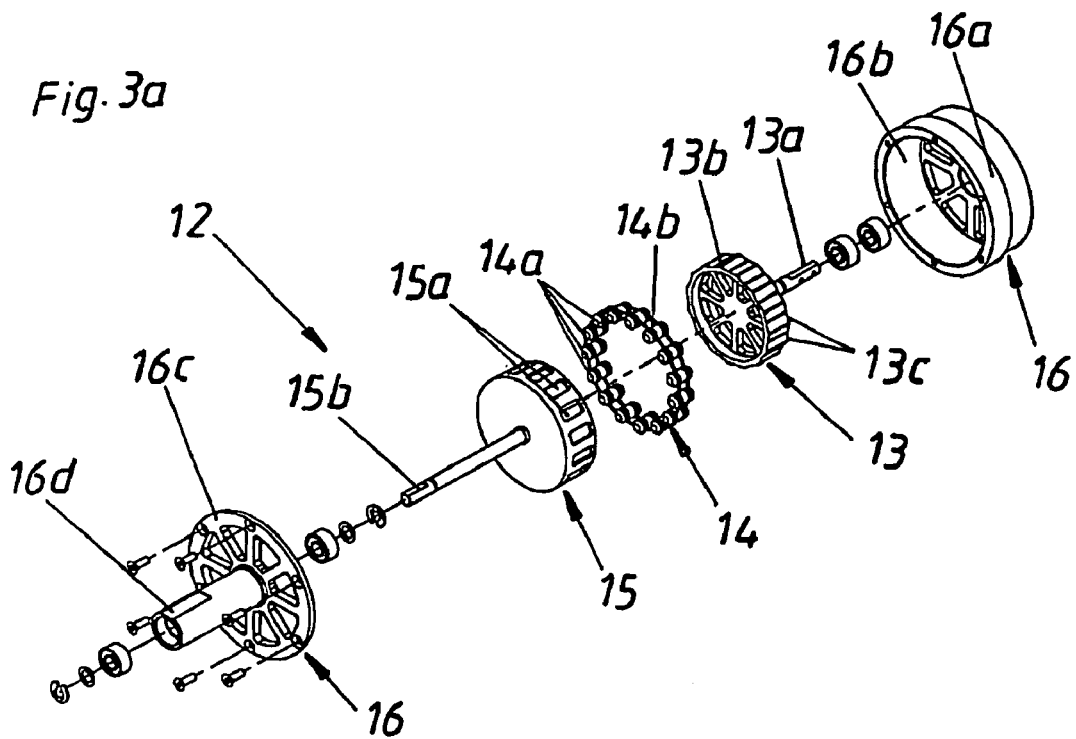
Figure 3B:
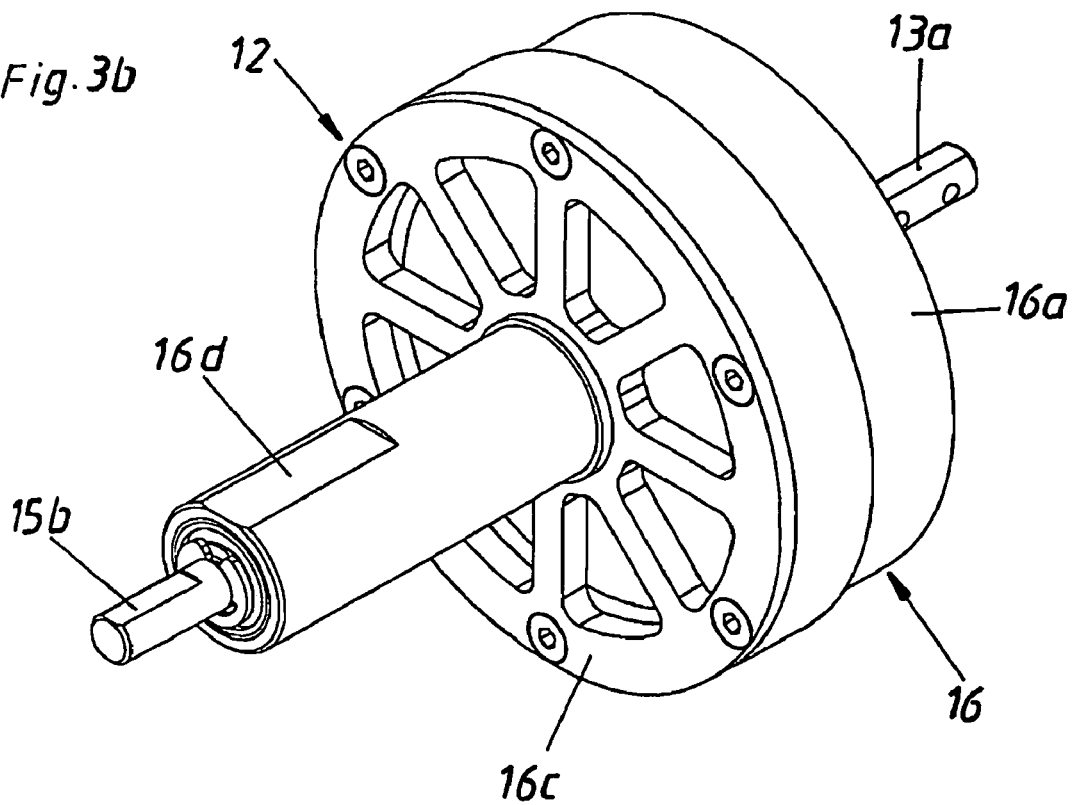
Figure 4A:
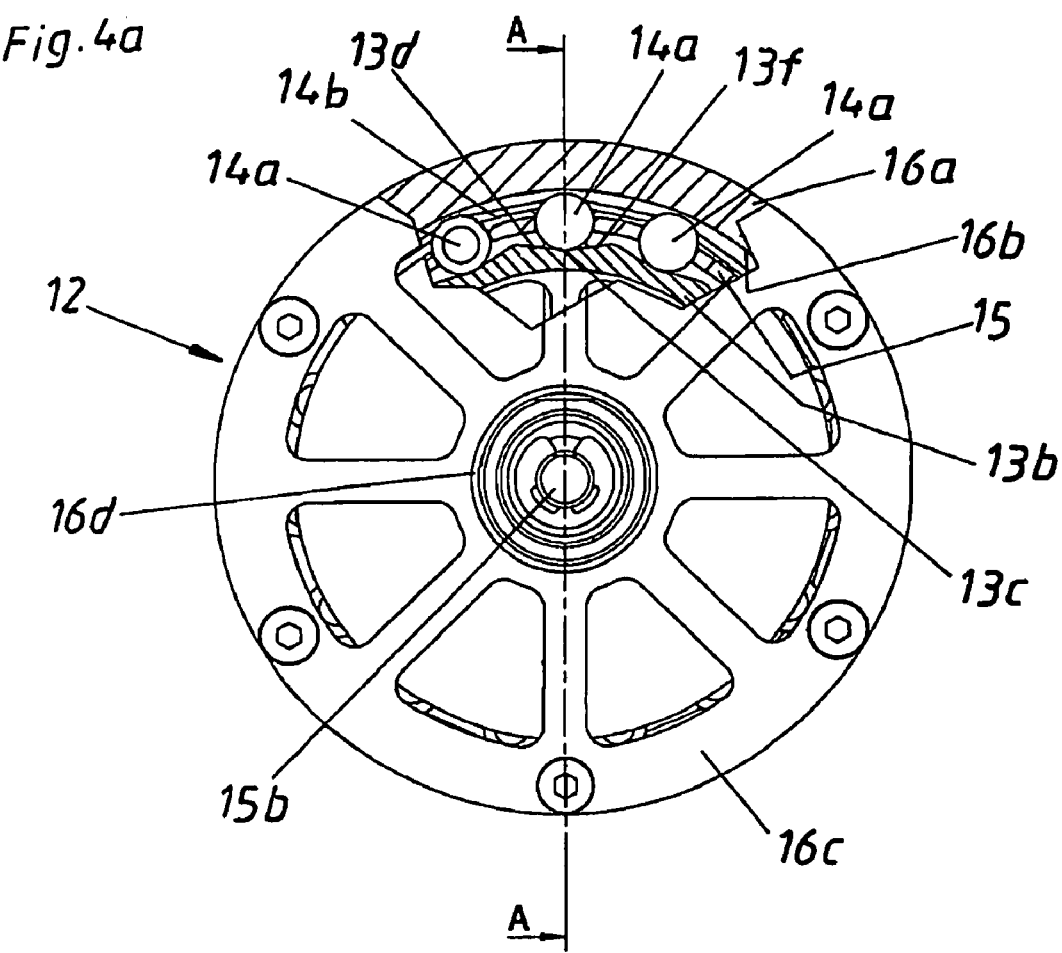
Figure 4B:
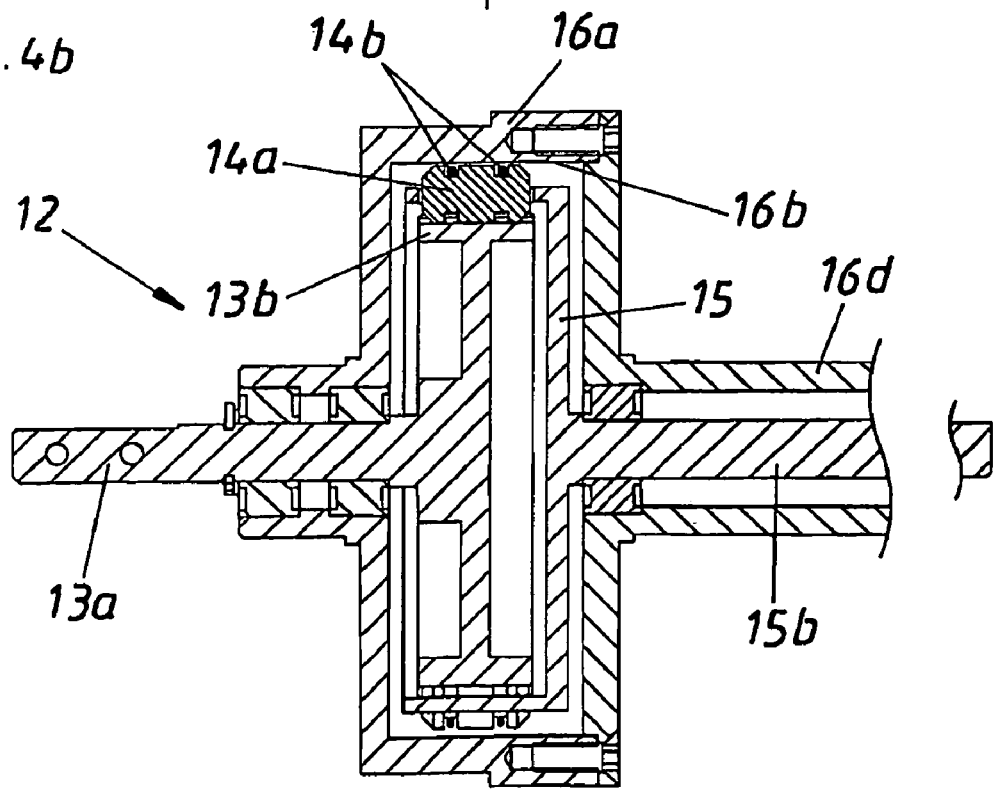
Figure 5A:
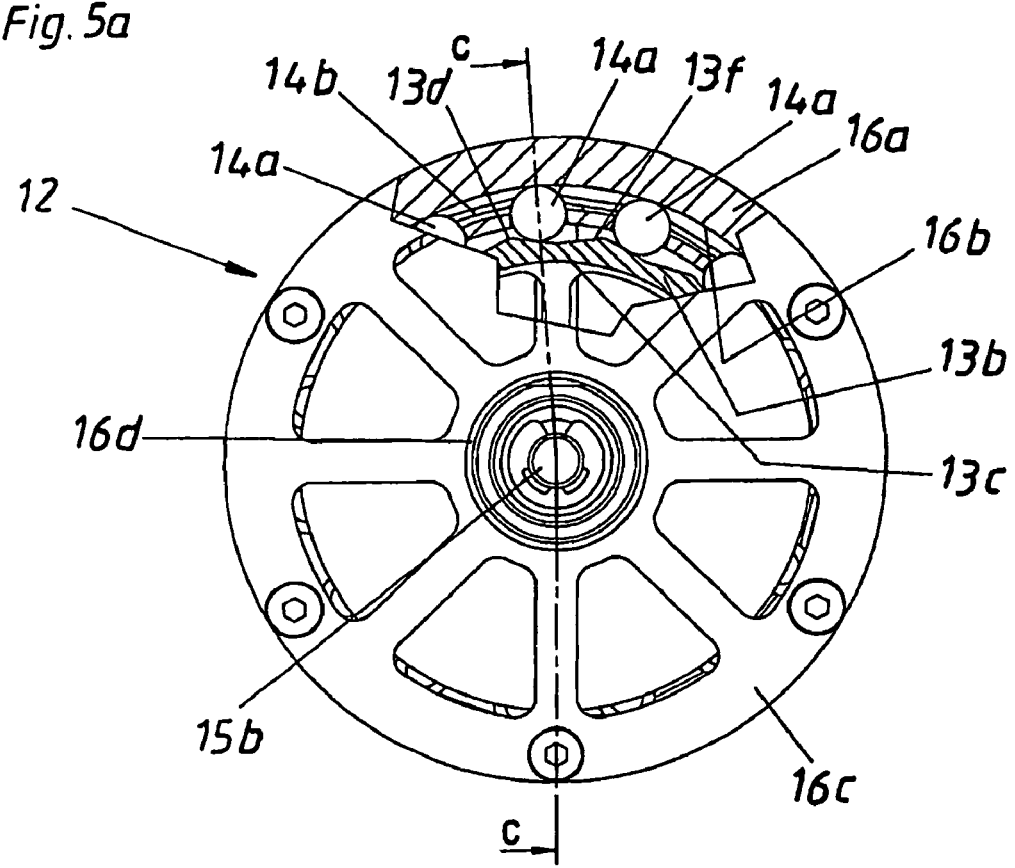
Figure 5B:
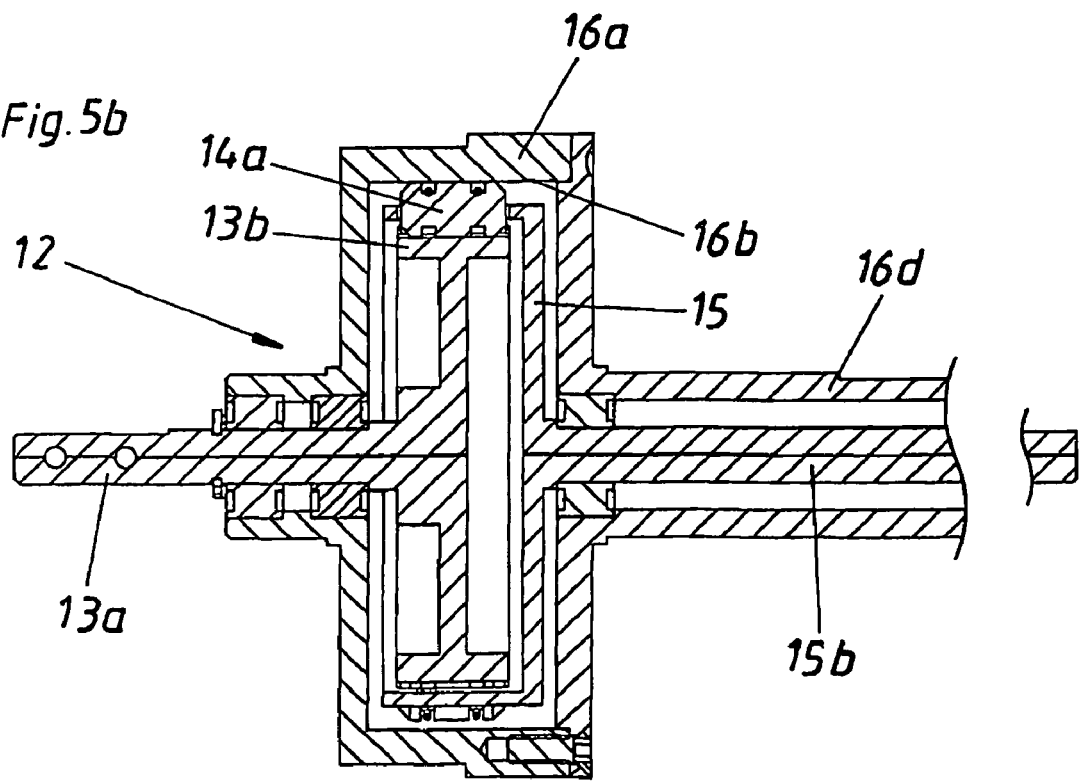
Figure 6A:
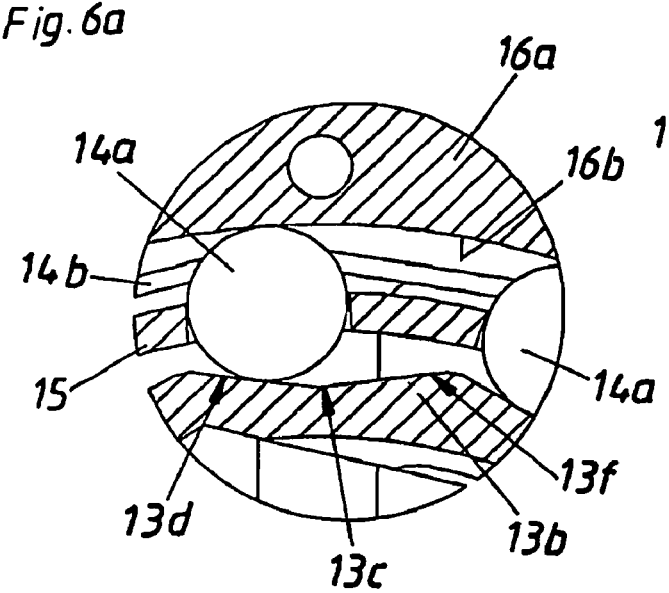
Figure 6B:
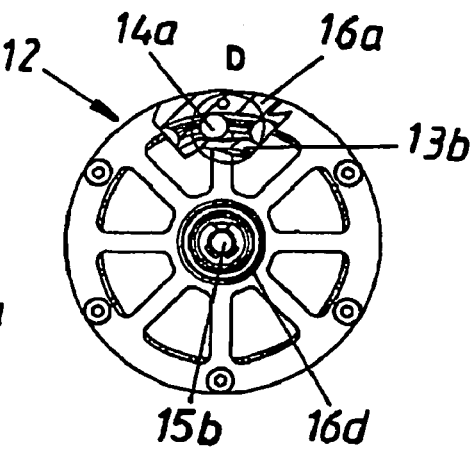
Figure 7A:
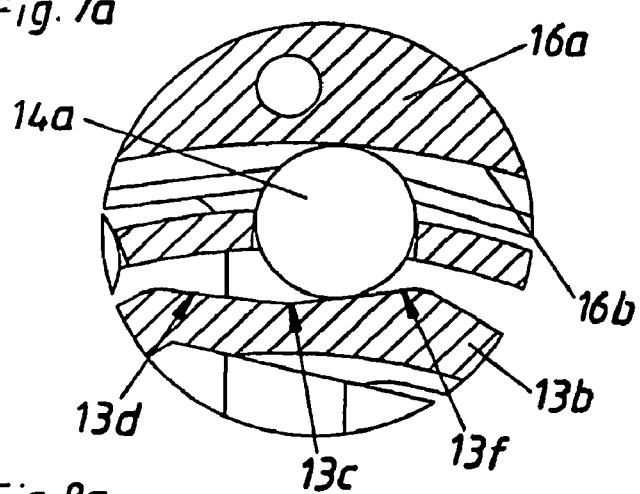
Figure 7B:
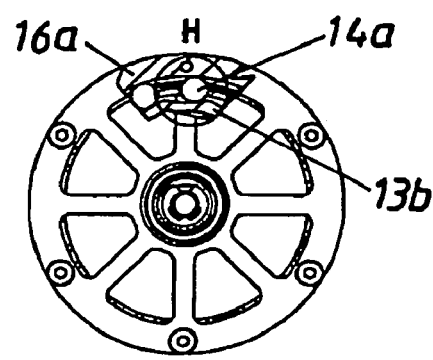
Figure 8A:
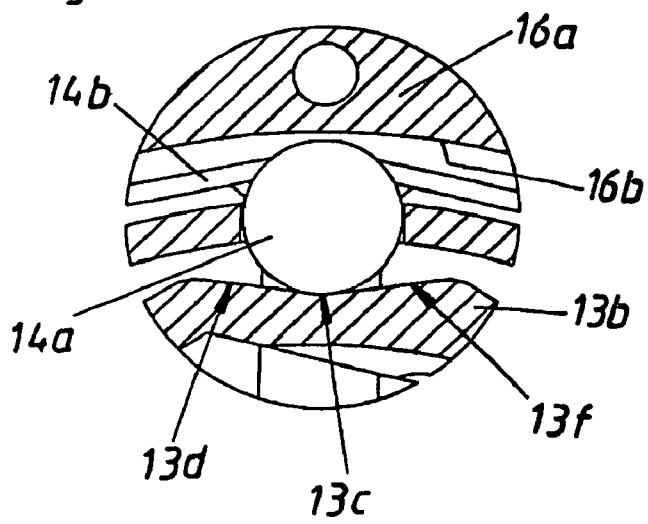
Figure 8B:
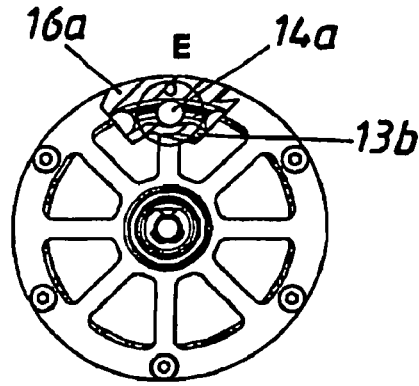
Figure 9:
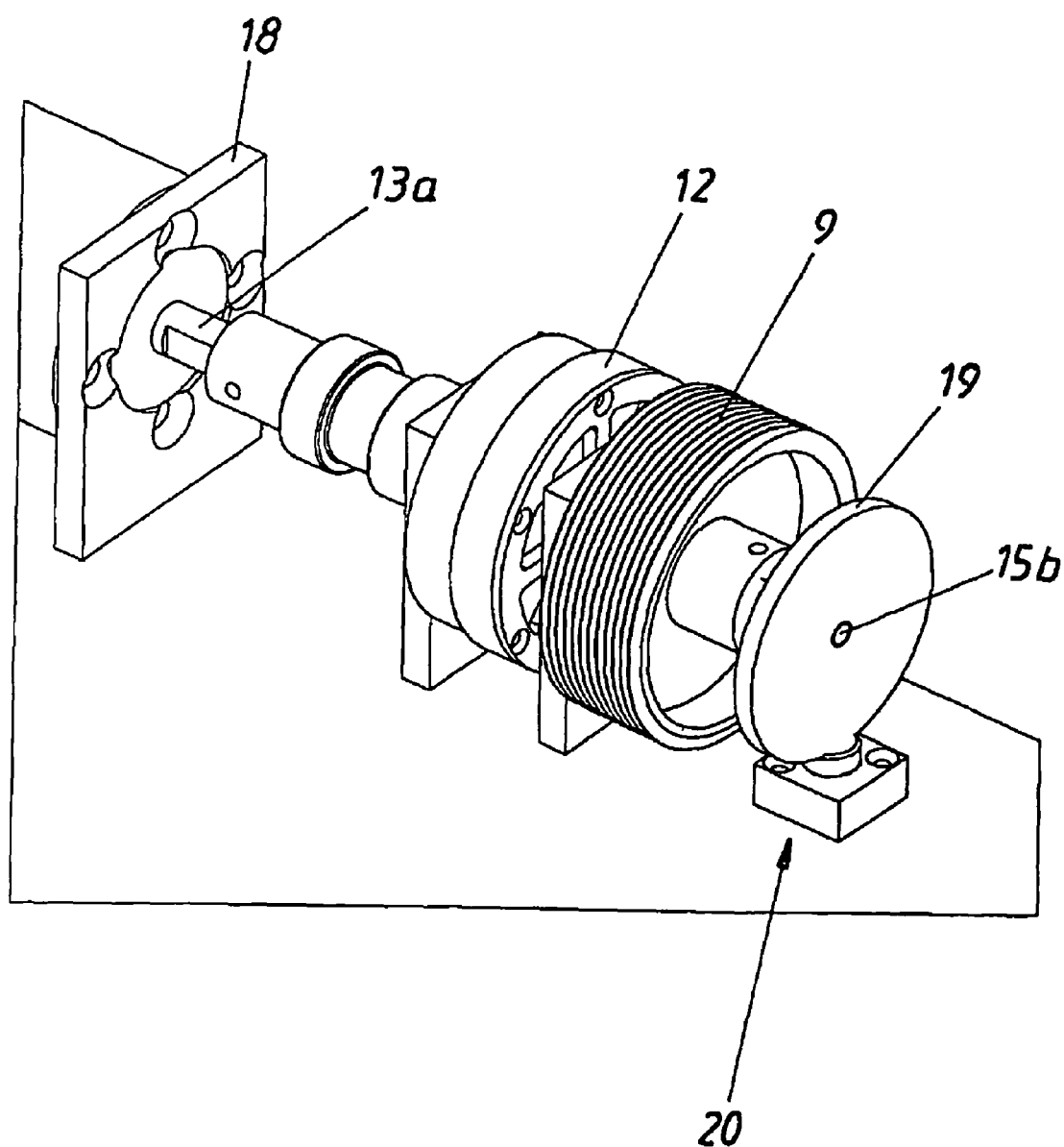

Further details and advantages of the present invention are described with reference to the specific description hereinafter. In the drawings:

FIG. 1 shows a diagrammatic perspective view of a drawer displaceable relative to a body of furniture, with a drive device according to the invention, FIG. 2 shows a perspective view of the drive device of FIG. 1, FIGS. 3*a* and 3*b* show an exploded view of the coupling device and a perspective view thereof in the assembled condition, FIG. 4*a* and FIG. 4*b* show a partly broken-away front view of the uncoupled coupling device and a vertical section thereof, FIG. 5*a* and FIG. 5*b* show a partly broken-away front view of the coupled coupling device and a vertical section thereof, FIG. 6*a* and FIG. 6*b* show a partly broken-away front view and a detail view on an enlarged scale with a coupling device coupled in a direction of rotation, FIGS. 7*a* and 7*b* show a similar view to FIGS. 6*a* and 6*b* with a coupling device coupled in the opposite direction of rotation, FIG. 8*a* and FIG. 8*b* show a similar view to FIGS. 6*a* through 7*b*, wherein the force engagement of the coupling elements is disconnected, and FIG. 9 shows a diagrammatic perspective view of the coupling device with an exemplary braking device for achieving a predetermined threshold value for the coupling process.

FIG. 1 shows a perspective view of an article of furniture 1 having a movable furniture part 3 in the form of a displaceable drawer 4. By virtue of the purely diagrammatic illustration, the pull-out guide assemblies which are usually provided for the drawer 4, which are to be fixed on both opposite side walls of the body or carcass 2 of the article of furniture, are not shown. To move the drawer 4 from a closed position into an open position or in the reverse direction, there is provided a drive device 7 with an electric drive unit 5, the movement being transmitted to the drawer 4 by way of a transmission mechanism 6. For reasons of advantageous force transmission, the transmission mechanism 6 is arranged centrally beneath the drawer bottom 4a. The drawer 4 is in an open position in the illustrated Figure.

FIG. 2 shows a diagrammatic perspective view of the drive device 7 shown in FIG. 1. It comprises an electric drive unit 5 which acts by way of a gear arrangement 11 (preferably an angle gear arrangement) and a coupling device 12 on a cable drive. The transmission mechanism 6 includes a pulley 9 which acts by way of a pulling cable line 9a on a linearly displaceable carrier 8. The movement of the carrier 8 controls a second pulley 9b which has a fitting 10 for fixing to a drawer bottom 4a (FIG. 1). The design configuration and function of the transmission mechanism 6 is not referred to in greater detail here. What is essential to the invention is the coupling device 12 operative between the electric drive unit 5 and the movable furniture part 3.

FIG. 3a shows an exploded view of the coupling device 12. It includes a drive 13 having a drive shaft 13a and a rotor 13b formed thereon. Recesses 13c are arranged around the circumferential surface of the rotor 13b in an equally spaced manner, said recesses 13c are provided for receiving coupling elements 14a acted upon by spring means 14. The coupling elements 14a are preferably in the form of rollers or balls connected together by way of a closed elastic band 14b. Associated with each coupling element 14a is a recess 13c of the rotor 13, that is to say each coupling element 14a is arranged in a recess 13c associated therewith or at the inclined surfaces rising at both sides of the recess 13c. In the illustrated Figure, there are two elastic bands 14b which extend parallel to each other and which urge the coupling elements 14a into the recesses 13c of the rotor 13b in the first operating position of the coupling device 12 (that is to say in the 'disconnected' shift position or open coupling). A cylindrical cage 15—which is part of a braking device for overcoming the spring force of the elastic band 14b—has a shaft 15b, the rotation of which is restrained by an external device (for example shaft 15b rubs against a rubber buffer or a pressure ball portion).

In that respect it can be provided in order for the braking force to be adjustable, as the braking force determines the threshold value of coupling engagement of the coupling device 12. That measure, that the shaft 15b of the cage 15 is always slightly braked, provides for a defined coupling engagement behaviour on the part of the coupling device 12. It will be seen that the cage 15 has rectangular openings 15a in which the coupling elements 14a in roller form constantly engage. When the coupling device 12 is closed, that is to say brought into coupling engagement by force lock, the coupling elements 14 are clamped between the rotor 13b and the drive output 16. The drive output 16 is of a two-part configuration and includes a drum 16a, against the inside 16b of the cylindrical outside wall of which the coupling elements 14a can be brought clampingly into contact. The second part of the drive output 16 is the cover 16c which can be screwed to the drum 16a, with the actual drive output shaft 16d.

FIG. 3b shows a perspective view of the coupling device 12 in the assembled condition. Shown here is the drive shaft 13a which extends into the drive output 16 with the drum 16a and the cover 16c. It is also possible to see the shaft 15b of the cage 15, which is restrained in its rotation by an external braking device (not shown in greater detail here). The actual drive output shaft 16d is supported in coaxial relationship with the drive shaft 13a and the shaft 15b of the cage 15.

FIG. 4a shows a partly broken-away front view of the uncoupled coupling device 12 so that the drive power train between the electric drive unit 5 and the drive output shaft 16d is interrupted. FIG. 4a shows the coupling device 12 viewed from the side of the drive output shaft 16d. From that side, it is possible to see the cover 16c as well as the shaft 15b, which is to be braked, of the cage 15. In the broken-away detail it is possible to see the drive 13 with its rotor 13b, at the peripheral edge of which and therearound are disposed recesses 13c and on both sides of the recess 13c radially outwardly extending inclined surfaces 13d and 13f. In the illustrated Figure the individual coupling elements 14a lie snugly in the recesses 13c so that a slight gap still remains between the coupling elements 14a and the inside 16b of the cylindrical drum 16a, that is to say there is no coupling between the rotor 13b and the drum 16a associated with the drive output shaft 16d. In the illustrated Figure the coupling elements 14a are pressed into the recesses 14c by the elastic band 14b.

FIG. 4b shows the operating position corresponding to FIG. 4a (in which no coupling occurs) in a vertical section along the plane A-A shown in FIG. 4a). It is possible to see the drive shaft 13a with the rotor 13b which is provided thereon and which carries the coupling elements 14a. The coupling elements are urged against the peripheral surface of the rotor 13b by the two elastic bands 14b. To achieve a defined coupling behaviour as from a predetermined threshold value, the arrangement has the cage 15 whose shaft 15b is slightly restrained in respect of its rotation. It is also possible to see the gap remaining between the coupling element 14a and the inside 16b of the drum 16a.

FIG. 5a shows the coupling device 12 in the closed condition, that is to say there is an uninterrupted drive power train between the electric drive unit 5 (not shown) and the drive output shaft 16d. It will be seen that the rotor 13b was rotated slightly in the clockwise direction by a movement of the electric drive unit 5 in comparison with FIGS. 4a and 4b, whereupon a force-locking connection can be immediately produced between the coupling elements 14a and the inside 16b of the drum 16a (which is fixedly connected to the drive output shaft 16d). As the cylindrical cage 15 is constantly slightly braked by its shaft 15b for compensation of the spring force of the elastic band 14b, a clamping connection is immediately produced upon the slightest rotary movement of the rotor 13b, more specifically by the inclined surfaces 13d (of which only one is identified for the sake of clarity) which press the coupling elements 14a against the inside 16b of the drum 16a. In the reverse direction of rotation of the electric drive 5 the inclined surfaces 13f correspondingly come into operation, which also press the coupling elements 14a against the inside 16b of the drum 16a. When the electric drive 5 comes to a stop the coupling elements 14a are immediately pressed into the recesses 13c again by the force of the elastic band 14b so that no coupling occurs between the drive shaft 13a and the drive output shaft 16d.

FIG. 5b shows a vertical section along the plane C-C shown in FIG. 5a, with the closed coupling. It will be seen that the coupling elements 14a are pressed both to the rotor 13b and also to the inside 16b of the drum 16a of the drive output shaft 16d.

FIGS. 6a and 6b show in a front view (FIG. 6b) the operating position of the coupling device 12, in which the rotor 13b was rotated in the clockwise direction, whereupon a clamping connection can be produced between the rotor 13b and the drum 16a by way of the coupling elements 14a. FIG. 6a shows the detail view of the circle shown in FIG. 6b on an enlarged scale. It will be apparent from FIG. 6a that at its peripheral edge the rotor 13b has recesses 13c with respectively adjoining inclined surfaces 13d and 13f arranged at regular spacings around the entire peripheral edge of the rotor 13b. It is also possible to see the cage 15 through which the coupling elements 14a pass, and the elastic band 14b. The coupling elements 14a are pressed against the inside 16b of the drum 16a by the inclined surfaces 13d, whereby the force-locking closure condition is brought about and the coupling device 12 is closed. A particularity of the invention is now that the coupling device 12, in that coupled condition, is movable—for example manually—in the direction of rotation which is predetermined by the electric drive unit 5 if the drive output shaft 16d (and therewith the drum 16a) is moved faster than the rotor 13b of the drive 13. Upon a faster movement of the drum 16a—caused by assisting manual actuation of the movable furniture part 4—the clamping connection between the coupling elements 14a and the drum 16a is releasable as the wedge action between those two components is temporarily released. In addition the coupling locking engagement can also be released by the electric drive unit 5, after a stop, in one direction of rotation, being moved slightly in the opposite direction of rotation, whereupon the coupling elements 14a are pressed into the recess 13c again by the elastic band 14b. Preferably the angular range involved in the opposite rotary movement of the electric drive unit 5 is between 1° and 10°, preferably between 2° and 6°.

FIG. 7a and FIG. 7b show similar views to FIG. 6a and FIG. 6b, wherein the electric drive unit 5 and therewith the rotor 13b have been rotated in the counter-clockwise direction. In this case the clamping connection is produced between the other inclined surface 13f by way of the clamping elements 14a and the inside 16b of the drum 16a. In this case also the clamping locking engagement can be temporarily released by the drum 16a being moved in the counter-clockwise direction faster than the rotor 13b, by an additional supporting (for example manual) movement.

FIG. 8a shows the stopped condition of the electric drive 5 and therewith the rotor 13b, with the coupling elements 14a being pressed into the recesses 13c by the elastic band 14b. It is possible to see the gap between the coupling element 14a and the inside 16b of the drum 16a so that the coupling is thus open. In that operating position, the movable furniture part 4 can be freely moved within its end positions.

FIG. 9 diagrammatically shows an embodiment for restraining the rotary movement of the shaft 15b, which is provided at the cylindrical cage 15 arranged in the interior of the coupling apparatus 12. To achieve a defined coupling engagement as from a predetermined or predeterminable threshold value, fixed to the shaft 15b is a brake disk 19 which is slightly restrained in its rotary movement on a braking device 20. The braking device 20 can in that case have for example a rubber buffer or a pressure ball portion against which the brake disk 19 rubs. Reference 18 denotes a motor casing into which the drive shaft 13a can be inserted.

The present invention is not limited to the illustrated embodiment by way of example but embraces or extends to all variants and technical equivalents which can fall within the scope of the accompanying claims. The positional references adopted in the description such as for example top, bottom, lateral and so forth are also related to the usual position of installation of the drive device 7 and to the immediately described and illustrated Figure and upon a change in position are to be appropriately converted to the new position. The coupling elements 14a are preferably made from metal.

The invention claimed is:

1. An article of furniture having a movable furniture part comprising:
   a drive device for moving said movable furniture part;
   said drive device comprises an electric drive unit and a coupling device for at least temporarily transmitting a force of said electric drive unit to said movable furniture part; said coupling device has a drive and a drive output; wherein operative between said drive and said drive output are coupling elements by which in a first operating position a clamping connection between said drive and said drive output and thus coupling between said drive and said drive output can be produced, and wherein in a second operating position said coupling elements are movable into a position in which said drive and said drive output are not coupled.

2. The article of furniture according to claim 1, wherein said drive and said drive output are rotatable relative to each other.

3. The article of furniture according to claim 2, wherein said drive and said drive output are arranged coaxially relative to each other.

4. The article of furniture according to claim 1, wherein said drive comprises a rotor, said rotor has recesses for accommodating said coupling elements, said recesses are arranged around a circumferential surface of said rotor.

5. The article of furniture according to claim 4, wherein said recesses are equally spaced around said circumferential surface of said rotor.

6. The article of furniture according to claim 1, wherein said coupling elements can be brought into said first operating position by spring means.

7. The article of furniture according to claim 6, wherein said spring means comprise at least one elastic band which extends around said rotor (13b) and by which said coupling elements can be pressed into said recesses in said first operating position.

8. The article of furniture according to claim 4, wherein said recesses comprise inclined surfaces, said coupling elements can be brought into engagement with said inclined surfaces in said second operation position, wherein said coupling elements are in force-lockingly connected relationship both with said drive and also with said drive output.

9. The article of furniture according to claim 8, wherein said drive output comprises a drum, said coupling elements are connected to said drum in a friction-locked manner in said second operation position.

10. The article of furniture according to claim 1, wherein a clamping connection between said drive and said drive output is releasable by manual actuation of said drive output in a direction of the direction of rotation exerted by said drive unit.

11. The article of furniture according to claim 9, wherein said drum is of a substantially cylindrical configuration, said coupling elements can be caused to bear against an inside (16b) of an outside wall of said drum.

12. The article of furniture according to claim 1, wherein a braking device is provided being operative between said drive and said drive output, said braking device having a predetermined or a predeterminable braking force.

13. The article of furniture according to claim 12, wherein said braking device comprises a cage having a shaft formed thereon, said shaft is restrained in its rotation.

14. The article of furniture according to claim 13, wherein said cage comprises openings in which said coupling elements engage.

15. The article of furniture according to claim 13, wherein said cage is arranged between said coupling elements and said drum of said drive output.

16. The article of furniture according to claim 1, wherein said coupling elements are in the form of rollers or balls.

17. The article of furniture according to claim 1, wherein said drive unit comprises at least one electric motor.

18. The article of furniture according to claim 17, wherein said electric motor is switchable in preferably two directions of rotation.

19. The article of furniture according to claim 17, wherein said electric motor is automatically movable after a stop in one direction of rotation within a predetermined angular range in the opposite direction of rotation.

20. The article of furniture according to claim 19, wherein said angular range is between 1° and 10° or between 2° and 6°.

21. The article of furniture according to claim 1, wherein a mechanical coupling can be automatically produced between said drive and said drive output in both directions of rotation of said electric drive unit by said coupling device.

22. The article of furniture according to claim 1, wherein said drive output is freely movable in both directions of rotation starting from an uncoupled condition between said drive and said drive output.

23. The article of furniture according to claim 1, wherein said drive output is manually movable in a direction of rotation exerted in the direction of said drive unit, starting from a coupled condition between said drive and said drive output, if said drive output is moved faster than said drive.

* * * * *